Patented Nov. 20, 1951

2,575,755

UNITED STATES PATENT OFFICE 2,575,755

ALKALI STABILIZED CALCIUM PHOSPHATE PHOSPHOR

Herman C. Froelich and Joseph M. Margolis, Cleveland Heights, Ohio, assignors to General Electric Company, a corporation of New York No Drawing. Application October 26, 1950, Serial No. 192,364

9 Claims. (Cl. 252—301.4)

Our invention relates to fluorescent compositions and to the manufacture thereof, and more particularly to the known compositions of calcium orthophosphate doubly activated with trivalent cerium and divalent manganese and referred to hereinafter as the parent phosphor.

The said parent phosphor, when excited by ultraviolet radiations of 2537 Å. wavelength, emits a deep red light and has been employed in fluorescent lamps in admixture with other phosphors to produce a white light, particularly where color rendering is important. As thus employed, the phosphor mixture is applied as a powdered coating to the interior surface of a low pressure mercury vapor lamp operating with a mercury vapor pressure of the order of 1–20 microns. However, it has been found that the parent phosphor, as heretofore constituted and manufactured, was not always satisfactory from the standpoint of lumen maintenance (upkeep of brightness during life of the lamp). The result was a color shift during burning of the lamp due to the fact that the parent phosphor depreciated more rapidly than did the other phosphors in the coating.

It is therefore an object of our invention to so modify the composition and manufacture of the said parent phosphor as to improve and stabilize its maintenance, and even its efficiency.

We have also discovered that the phosphor, when modified in accordance with our invention, exhibits greatly increased temperature stability, the brightness at about 300° C. being approximately three-fold the brightness of unmodified phosphor at the same temperature. The phosphor thereby becomes useful in conjunction with high pressure mercury vapor lamps for color-correction purposes. To that end the phosphor is applied as a coating on the inner surface of a glass bulb enclosing a high pressure (about one atmosphere to many atmospheres of mercury pressure) mercury vapor tube where it is excited by the ultraviolet radiations emitted by the mercury vapor tube to emit red light which supplements the blue-green light of the mercury vapor tube.

Further objects and advantages of our invention will appear from the following description.

We have discovered that the above objectives can be attained by incorporating in the parent phosphor a small amount of alkali metal. This is contrary to all previous experience which has indicated that alkalies should be scrupulously excluded from fluorescent lamp phosphors.

While we prefer to employ sodium as the additive, we have also obtained good results with potassium and lithium as well as rubidium and caesium. The alkali metal may be incorporated in the phosphor simply by adding a suitable salt thereof to the batch ingredients before firing to synthesize the composition. When the additive is sodium we prefer to add it as NaCl, but we have also obtained good results by employing other salts of sodium such as $Na_3PO_4$, $Na_2SO_4$, $NaNO_3$, $Na_2CO_3$ and $Na_2B_4O_7$. Thus, whereas the lumen drop of phosphors containing no additive was about 25%, for phosphors made with NaCl it was about 2–3% for the period of 0 to 100 hours of lamp burning, and about 6% for phosphors made with the said other salts. Similarly, when employing the other alkalies, the nature of the compound used to introduce the additive into the phosphor composition is of little importance; it is the cation, not the anion, part of the compound which produces the desired effects, and it may be introduced as, for example, carbonate, chloride, phosphate, hydroxide, etc.

A suitable range for all the alkalies is about .001 to .05 mole of alkali oxide per mole CaO of the parent calcium-cerium-manganese orthophosphate phosphor, with a preferred range, on the same basis, of about .008 to .035 mole for sodium and about .015 to .03 mole for lithium.

By way of example, the phosphor containing sodium as an additive may be prepared by employing a batch consisting of

| | Grams |
|---|---|
| $CaHPO_4$ | 135 |
| $MnCO_3$ | 6.5 |
| $Ce_2(C_2O_4)_3.9H_2O$ | 41.0 |
| $CaCO_3$ | 17.9 | and mixing the ingredients by rolling for one hour. The powder is then thoroughly wetted with 1.2 grams of NaCl dissolved in water. The powder is dried at 120° C., screened through an 80 mesh screen and fired for one hour at 1230° C. It is then dry-milled for one hour, refired for one-half hour at 1230° C. and quickly transferred to a cooling chamber filled with 5% "forming" gas (5% $H_2$ and 95% $N_2$) where it is left until cool. It is then crushed and screened.

The results of several tests wherein 0.6% of NaCl by weight of the unfired composition was incorporated in the powder before firing showed that it had a lumen maintenance, between 0 and 100 hours of lamp burning, ranging between 92.5% and 97.5% as compared with 74% for a control lamp containing phosphor with no additive. Additional tests with amounts of NaCl varying from 0.6% to 2% showed little difference in maintenance as follows:

| Per Cent NaCl | Moles Na₂O per Mole CaO (Unfired powder basis) | Per Cent Loss of Lumens | |
|---|---|---|---|
| | | 0-100 Hrs. | 500/100 Hrs. |
| None | 0 | 26 | 8.3 |
| 0.6 | .009 | 3 | 4 |
| 1.0 | .015 | 2 | 4.5 |
| 1.5 | .023 | 2.5 | 4.5 |
| 2.0 | .032 | 4 | 7 |

It will be evident that the alkali additive not only prevents the large loss in the first 100 hours, but the level of light output is maintained better beyond 100 hours of burning.

As the amount of NaCl is increased the firing temperature must be lowered in accordance with the following table:

| Per Cent NaCl | Firing Temperature |
|---|---|
| | °C. |
| None | 1,260 |
| 0.6 | 1,230 |
| 1.0 | 1,220 |
| 1.5 | 1,200 |
| 2.0 | 1,160 |
| 3.0 | 1,050 |

With amounts of NaCl in excess of 3% the material is sintered, discolored and poorly fluorescent.

The useful range of NaCl, by weight, is:

|  | Per cent |
|---|---|
| Unfired powder basis | 0.3 –3.0 |
| Fired powder basis | 0.37–3.75 |
| As Na₂O, fired powder basis | 0.2 –2.0 |

The preferred range of NaCl, by weight, is:

|  | Per cent |
|---|---|
| Unfired powder basis | 0.6 –2.0 |
| Fired Powder basis | 0.75–2.5 |
| As Na₂O, fired powder basis | 0.4 –1.32 |

The "fired powder basis" in these tables has been calculated by assuming complete utilization of raw materials.

Chemical analysis of the powder shows that the sodium is part of the phosphor and is not volatilized during firing.

Although NaCl seems to be the most effective addition agent, good results have also been obtained with the phosphate, sulfate, nitrate, carbonate and borate of sodium in concentrations equivalent to 1% NaCl on the unfired basis.

An additional property of the modified phosphor is its high temperature stability. When heated on a hot plate in air up to 300° C., the fluorescence of the powders was good in all cases and best for powder treated with 2% NaCl. The unmodified powder showed little fluorescence at this temperature as appears from the following table:

| Per Cent NaCl | Brightness at 295° C. in Per cent of room temperature brightness |
|---|---|
| None | 18 |
| 0.6 | 58.5 |
| 2.0 | 61 |
| 3.0 | 30 |

The stabilized powders were still sensitive, at this temperature, to radiations of 2537, 3000 and 3650 A. When cooled down again they recovered up to 90% of their original brightness. This high temperature heating causes a shift in spectral emission from 6500 to 6300 A. at 295° C. which reverts upon cooling.

We have also observed that the addition of NaCl to calcium-strontium phosphate activated with trivalent cerium and divalent manganese causes the spectral emission of this phosphor to shift from 6425 A. back to 6500 A., the normal emission of the parent phosphor (calcium phosphate activated with trivalent cerium and manganese).

For the preparation of a lithium treated phosphor of slightly different base composition than the previous example, the raw materials consisting of

|  | G. |
|---|---|
| CaHPO₄ | 430 |
| CaCO₃ | 70 |
| Ce oxalate | 112 |
| MnCO₃ | 20 |
| LiCO₃ | 2.64 | are mixed well by tumbling, then fired in air on quartz trays at 1200° C. for one hour. After cooling, the powder is ball-milled and then refired in air at the same temperature for one-half hour. It is quickly transferred from the furnace to a cooling chamber containing an atmosphere of 5% "forming" gas. When cooled down to room temperature the powder is sieved and then used for lamp making.

Some results obtained with the lithium additive are shown in the following table:

| Per Cent Li₂O (Fired Powder Basis) | Moles Li₂O per Mole CaO | Per Cent Loss of Lumens, 0-100 Hrs. |
|---|---|---|
| 0 | 0 | 26 |
| .035 | .0015 | 24 |
| .105 | .0046 | 22.5 |
| .21 | .0092 | 16 |
| .35 | .0154 | 10 |
| .35 | .0154 | 13 |
| .70 | .031 | 14 |

In these tests the lithium was added as carbonate and required progressive lowering of the firing temperature from 1240° to 1170° C. with increasing Li content to prevent excessive sintering.

The tests also showed that initial lamp efficiencies are practically unaffected by the presence of lithium or sodium, but the 100 hour efficiencies are consistently improved to reach an optimum in the region of about .35% Li₂O or about 1% Na₂O. The 100 hour loss is thus greatly reduced compared with that of the untreated phosphor. This results in considerably higher absolute efficiencies at 100 hours and thereafter.

Other tests showed that potassium was about equally effective as lithium, and rubidium and caesium likewise showed improvement but are not to be preferred, from a commercial standpoint, because of cost. For instance, an addition of 0.5% K₂O (.007 mole per mole CaO of the calcium phosphate) reduced the 100 hour loss to 14.5% as compared to the 26.5% loss of a control with no additive.

These other alkalies, like sodium, also increase the temperature stability of the phosphor. Thus, the brightness at 300° C. relative to brightness at room temperature was 18% for no additive, 50% for .5% K₂O and 57% for .35% Li₂O.

It will be understood, as heretofore known, that as to the parent phosphor itself (calcium phosphate activated with cerium and manganese) it is important for good results that the matrix be orthophosphate and that it be activated with trivalent (cerous) cerium. It is therefore necessary that the phosphor be processed in a reducing atmosphere, either by firing (and cooling) in a reducing atmosphere or (as in the examples given herein) firing in air and cooling in a reducing atmosphere. The proportions of activating manganese and cerium are not very critical, though best results are obtained with some 1-5% of manganese and some 6-16% of cerium, by weight of the fired phosphor.

What we claim as new and desire to secure by Letters Patent of the United States is:

1. A fluorescent composition consisting essentially of calcium orthophosphate and manganese and trivalent cerium in activator proportions and an alkali metal in an amount of about .001 to .05 mole alkali oxide per mole CaO in the phosphor.

2. A fluorescent composition consisting essentially of calcium orthophosphate and manganese and trivalent cerium in activator proportions and sodium in an amount of about .008 to .035 mole $Na_2O$ per mole CaO in the phosphor.

3. A fluorescent composition consisting essentially of calcium orthophosphate and manganese and trivalent cerium in activator proportions and lithium in an amount of about .015 to .03 mole $Li_2O$ per mole CaO in the phosphor.

4. A fluorescent composition consisting essentially of calcium orthophosphate and manganese and trivalent cerium in activator proportions and potassium in an amount of about .001 to .05 mole $K_2O$ per mole CaO in the phosphor.

5. The method of improving the stability of phosphor of calcium orthophosphate activated with manganese and trivalent cerium which comprises preparing a mixture of ingredients which when fired will yield the said phosphor, adding to the said mixture, before firing, a small amount of a salt of an alkali metal in the range of about .001 to .05 mole alkali oxide per mole CaO in the ingredients, and synthesizing the mixture at an elevated temperature of the order of 1000-1300° C. under reducing conditions.

6. The method of improving the stability of phosphor of calcium orthophosphate activated with manganese and trivalent cerium which comprises preparing a mixture of ingredients which when fired will yield the said phosphor, adding to the said mixture, before firing, a small amount of a salt of sodium in the range corresponding to about .008 to .035 mole $Na_2O$ per mole CaO in the ingredients, and synthesizing the mixture at an elevated temperature of the order of 1000-1300° C. under reducing conditions.

7. The method of improving the stability of phosphor of calcium orthophosphate activated with manganese and trivalent cerium which comprises preparing a mixture of ingredients which when fired will yield the said phosphor, adding to the said mixture, before firing, a small amount of sodium chloride in the range corresponding to about .008 to .035 mole $Na_2O$ per mole CaO in the ingredients, and synthesizing the mixture at an elevated temperature of the order of 1000-1300° C. under reducing conditions.

8. The method of improving the stability of phosphor of calcium orthophosphate activated with manganese and trivalent cerium which comprises preparing a mixture of ingredients which when fired will yield the said phosphor, adding to the said mixture, before firing, a small amount of a salt of lithium in the range corresponding to about .015 to .03 mole $Li_2O$ per mole CaO in the ingredients, and synthesizing the mixture at an elevated temperature of the order of 1000-1300° C. under reducing conditions.

9. The method of improving the stability of phosphor of calcium orthophosphate activated with manganese and trivalent cerium which comprises preparing a mixture of ingredients which when fired will yield the said phosphor, adding to the said mixture, before firing, a small amount of a salt of potassium in the range corresponding to about .001 to .05 mole $K_2O$ per mole CaO in the ingredients, and synthesizing the mixture at an elevated temperature of the order of 1000-1300° C. under reducing conditions.

HERMAN C. FROELICH.
JOSEPH M. MARGOLIS.

REFERENCES CITED

The following references are of record in the file of this patent:

UNITED STATES PATENTS

| Number | Name | Date |
|---|---|---|
| 2,241,950 | Huniger | May 13, 1941 |